United States Patent
Nakazawa

[11] Patent Number: 6,038,085
[45] Date of Patent: Mar. 14, 2000

[54] SUPER WIDE ANGLE LENS

[75] Inventor: Kimiaki Nakazawa, Kitakatushika, Japan

[73] Assignee: Fuji Photo Optical Co., Ltd., Omiya, Japan

[21] Appl. No.: 09/131,430

[22] Filed: Aug. 10, 1998

[30] Foreign Application Priority Data

Aug. 21, 1997 [JP] Japan ................. H09-240403

[51] Int. Cl.[7] ........................... G02B 13/04; G02B 9/60
[52] U.S. Cl. ......................... 359/753; 359/763; 359/770
[58] Field of Search .................. 359/753, 749–752, 359/755–756, 762–763, 765, 768, 770–771, 775, 784, 680–682, 686, 688, 689

[56] References Cited

U.S. PATENT DOCUMENTS

| | | | |
|---|---|---|---|
| 3,741,630 | 6/1973 | Nakagawa | 359/751 |
| 3,856,386 | 12/1974 | Fujioka | 359/749 |
| 4,009,943 | 3/1977 | Horimoto | 359/723 |
| 4,310,222 | 1/1982 | Ikemori | 359/708 |
| 4,634,237 | 1/1987 | Aono et al. | 359/688 |
| 5,159,493 | 10/1992 | Tsutsumi | 359/680 |

FOREIGN PATENT DOCUMENTS

H9-80303  3/1997  Japan .

*Primary Examiner*—Georgia Epps
*Assistant Examiner*—Jordan M. Schwartz
*Attorney, Agent, or Firm*—Arnold International; Bruce Y. Arnold

[57] ABSTRACT

A super wide angle lens, having a viewing angle greater than 120 degrees, and an F-number of about 1.2 is disclosed. The lens is formed of a first lens group $G_1$ of negative refractive power, a second lens group $G_2$ of positive refractive power, and a third lens group $G_3$ of positive refractive power. The lens is designed so that the lens elements used in the lens groups may be easily and economically manufactured. The first lens group has a first lens element $L_1$ composed of a negative meniscus lens with its convex surface on the object side, and a second lens element $L_2$ composed of a negative meniscus lens with its convex surface on the object side. The second lens group includes a third lens element $L_3$, that is biconcave, cemented to a fourth lens element $L_4$ that is biconvex. The third lens group has four lens elements: a fifth lens element $L_5$ composed of a negative meniscus lens, with its convex surface on the object side; a sixth lens element $L_6$ composed of a biconvex lens cemented to the fifth lens element; a seventh lens element $L_7$ composed of a negative meniscus lens, with its convex surface on the object side; and an eighth lens element $L_8$ composed of a biconvex lens cemented to the seventh lens element.

5 Claims, 4 Drawing Sheets

EMBODIMENT 1

SUPER WIDE ANGLE LENS

BACKGROUND OF THE INVENTION

As an observation or photographic camera is often used indoors, where light levels are generally lower than outdoor, a lens with a low F-number is favored. Further, in order to view or photograph an area wider than the field of view of most cameras, a super wide angle lens is required.

Normally, a wide angle lens generates a negative distortion aberration, thereby imparting a size reduction effect on the image in the peripheral areas of the angle of view due to the distortion. However, when using a super wide angle lens having a very large angle of view, the distortion aberration is exacerbated to the extent that it becomes an even more serious problem, bringing the utility of such a lens into question. Therefore, a super wide angle lens having less distortion and which effectively corrects the image aberrations over the entire angle of view is needed.

A type of super wide angle lens is disclosed in Japanese Laid Open Patent Application No. 9-80303 (1997). However, with the lens described in this publication, there is need for improvement in the correction of aberrations. Especially in an observation or photographic camera, it is common for the lens to be inexpensive in order for the product to be inexpensive. In this case, there is the risk that colors may blur in the image as a result of insufficient correction of chromatic aberrations and so forth.

Furthermore, in order to devise a wide viewing angle, the radius of curvature of the concave surface of the frontal lens element(s) is generally made small with respect to the inner diameter of the lens element, thereby creating a tendency for the lens element surface to be shaped similar to that of a half sphere. This creates a problem in manufacturing the lens element, in that work such as lens grinding, and so forth, becomes very difficult.

BRIEF SUMMARY OF THE INVENTION

The present invention relates to a super wide angle lens having a comparatively small aperture and yet a low F-number, and which has a small distortion aberration for use in an observation or photographic camera. An object of the invention is to provide a super wide angle lens which is composed of lens elements shaped so as to be easily and inexpensively manufactured. The lens of the present invention is a super wide angle lens having an F-number of about 1.2 with an angle of view of about 120 degrees, while maintaining a favorable optical performance as a result of the lens having comparatively small chromatic aberrations and distortion.

The super wide angle lens of the present invention is comprised of, in order from the object side, a first lens group of negative refractive power, a second lens group of positive refractive power, and a third lens group of positive refractive power. The first lens group includes a first lens element composed of a negative meniscus lens with its convex surface on the object side, and a second lens element composed of a negative meniscus lens with its convex surface on the object side. The second lens group includes a third lens element composed of a biconcave lens that is cemented to a fourth lens element composed of a biconvex lens. The third lens group includes a fifth lens element, composed of a negative meniscus lens with its convex surface on the object side, a sixth lens element composed of a biconvex lens that is cemented to the fifth lens element, a seventh lens element composed of a negative meniscus lens with its convex surface on the object side, and an eighth lens element composed of a biconvex lens that is cemented to the seventh lens element.

BRIEF DESCRIPTION OF THE DRAWINGS

The present invention will become more fully understood from the detailed description given below and the accompanying drawings, which are given by way of illustration only and thus are not intended to limit the scope of the present invention, and wherein.

DETAILED DESCRIPTION OF THE INVENTION

Figure 1:
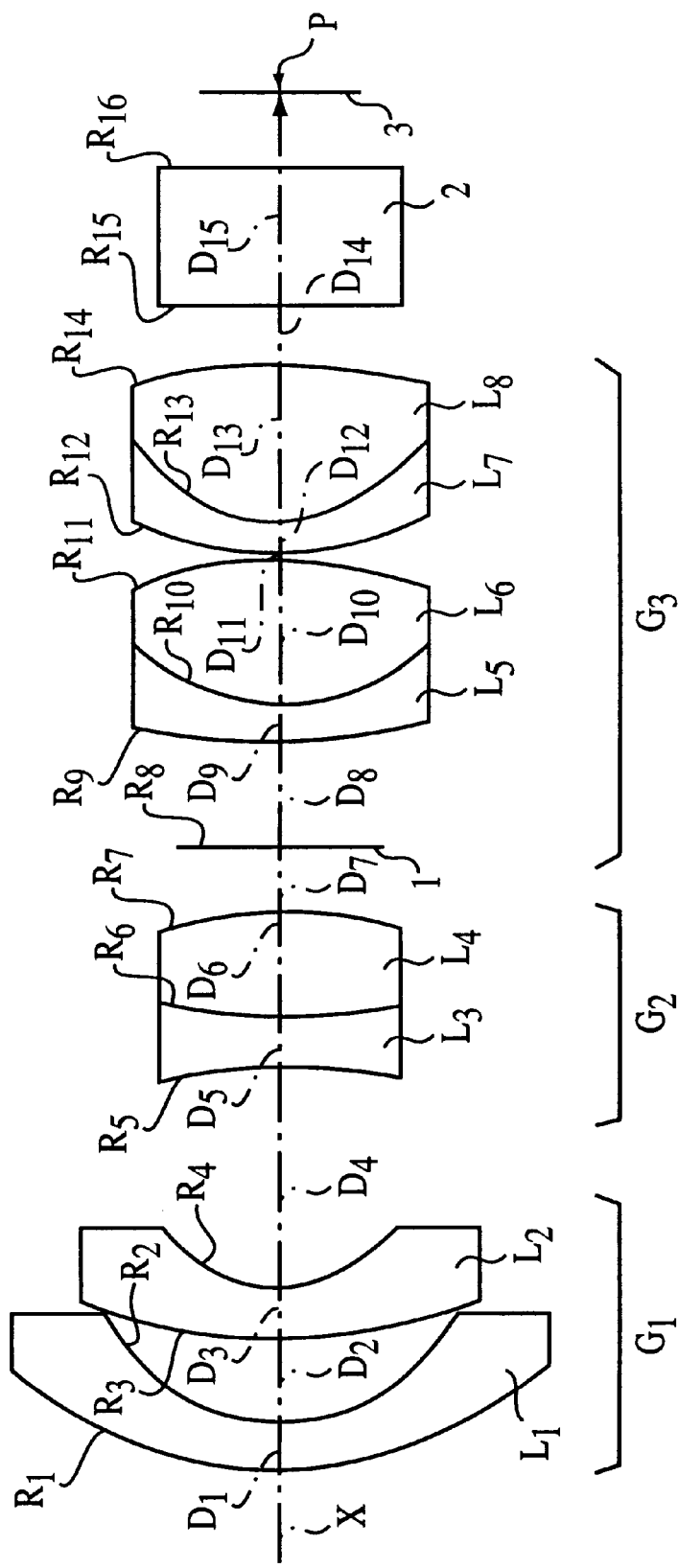
FIG. 1 shows the components of a super wide angle lens according to a first embodiment of the invention.
Figure 2:
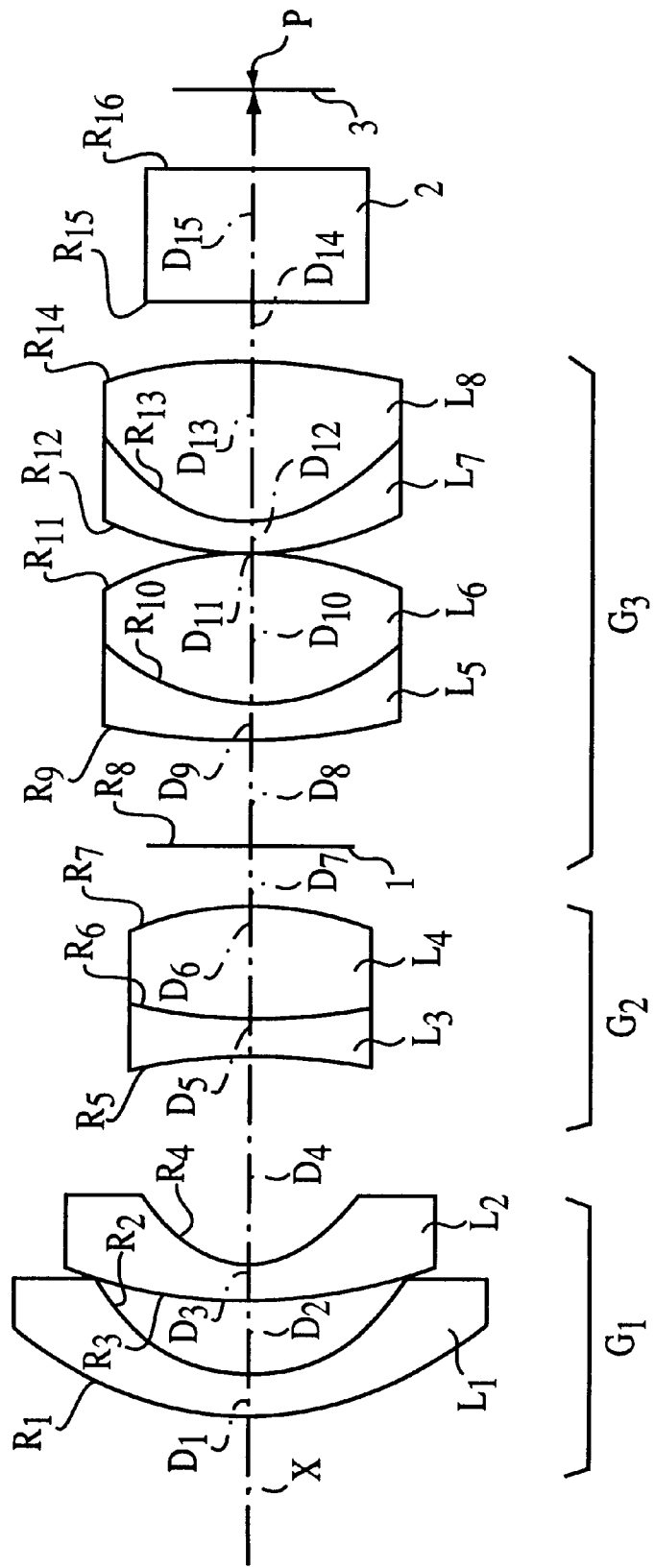
FIG. 2 shows the components of a super wide angle lens according to a second embodiment of the invention.

As shown in FIGS. 1 and 2, the super wide angle lens of the invention is a retro-focus type lens having, in order from the object side: a first lens group $G_1$ of negative refractive power, a second lens group $G_2$ of positive refractive power, and a third lens group $G_3$ of positive refractive power.

The first lens group $G_1$ includes a first lens element $L_1$ composed of a negative meniscus lens with its convex surface on the object side, and a second lens element $L_2$ composed of a negative meniscus lens with its convex surface on the object side. The second lens group $G_2$ includes a third lens element $L_3$, composed of a biconcave lens, that is cemented to a fourth lens element $L_4$ composed of a biconvex lens. The third lens group $G_3$ includes at least four lens elements, as follows: a fifth lens element $L_5$, composed of a negative meniscus lens with its convex surface on the object side; a sixth lens element $L_6$, composed of a biconvex lens, that is cemented to the fifth lens element $L_5$; a seventh lens element $L_7$, composed of a negative meniscus lens with its convex surface on the object side; and, an eighth lens element $L_8$, composed of a biconvex lens, that is cemented to the seventh lens element $L_7$.

The super wide angle lens of the present invention also satisfies the below conditional expressions (1) through (9).

$$BF/F > 2.7 \tag{1}$$

$$-2.3 < F_{G1}/F < -1.8 \tag{2}$$

$$-12.0 < F_{G1,2}/F < -4.5 \tag{3}$$

$$N_1 = N_2, N_1 > 1.75, N_2 > 1.75 \tag{4}$$

$$v5,7 < 30 \tag{5}$$

$$2.3 < R_2/F < 3.0 \tag{6}$$

$$1.6 < R_4/F < 2.2 \tag{7}$$

$$P_2/R_2 < 1.76 \tag{8}$$

$$P_4/R_4 < 1.76 \tag{9}$$

where

BF is the back focus of the super wide angle lens,

F is the focal distance of the super wide angle lens, $F_{G1}$ is the focal distance of the first lens group $G_1$, $F_{G1,2}$ is the combined focal distance of the first lens group $G_1$ and the second lens group $G_2$, $N_1$ is the refractive index for the sodium d-line of the first lens element $L_1$, $N_2$ is the refractive index for the sodium d-line of the second lens element $L_2$, $v_{5,7}$ is the average of the Abbe number for the sodium d-line of the fifth lens element $L_5$ and the seventh lens element $L_7$, $R_2$ is the radius of curvature of the image-side surface of the first lens element $L_1$, $R_4$ is the radius of curvature of the image-side surface of the second lens element $L_2$, $P_2$ is the inner diameter of the image-side surface of the first lens element $L_1$ (measured in a perpendicular direction with respect to the optical axis from the beginning edge to the ending edge of the curved surface), and $P_4$ is the inner diameter of the image-side surface of the second lens element $L_2$ (measured in a perpendicular direction with respect to the optical axis from the beginning edge to the ending edge of the curved surface).

The function of each lens group and of each lens element will now be described. The first lens group $G_1$ is composed of a first lens element $L_1$ and a second lens element $L_2$, each being a negative meniscus lens with its convex surface on the object side. The first lens group $G_1$ has a strong negative refractive power in order to make the super wide angle lens have a very short back focus (and hence, its super wide angle of view). The first lens element $L_1$ and the second lens element $L_2$ are made from a glass material of high refractive index and with a negative meniscus shape in order to correct the excess distortion which accompanies the wide angle of view.

Since a glass material with a high refractive index is used for the first lens element $L_1$ and the second lens element $L_2$, this not only corrects for distortion, but also increases what shall herein be termed "the ease of production" of the lens. In the manufacturing process, as the shape of a concave lens surface is ground from a flat surface to near a half sphere, the grinding of the lens becomes more difficult the deeper the surface. Therefore, if a glass material with a high refractive index is used for the first lens element $L_1$ and the second lens element $L_2$, then it becomes possible to secure a given negative refractive power without making the curvature radii of the concave surface on the image side of each of the first lens element $L_1$ and the second lens element $L_2$ too small.

The second lens group $G_2$ is composed of a third lens element $L_3$, which is a biconcave lens element that is cemented to a fourth lens element $L_4$ which is a biconvex lens element. The second lens group $G_2$ has a positive refractive power, and since the third lens element $L_3$ is composed of a biconcave lens element, it can correct aberrations other than distortion aberrations. More specifically, it can correct the negative spherical aberration generated in the lens elements following the fourth lens element $L_4$. Since the fourth lens element $L_4$ is a biconvex lens element, it can correct the negative distortion aberration that otherwise occurs for the super wide angle lens. In addition, because the third lens element $L_3$ and the fourth lens element $L_4$ are cemented together, it becomes possible to effectively correct the chromatic aberrations. More specifically, the lateral color can be effectively corrected.

The third lens group $G_3$ includes a fifth lens element $L_5$ composed of a negative meniscus lens with its convex surface on the object side cemented to a sixth lens element $L_6$ composed of a biconvex lens, and a seventh lens element $L_7$ composed of a negative meniscus lens with its convex surface on the object side cemented to an eighth lens element $L_8$ composed of a biconvex lens. By using these two sets of cemented lens elements, with each negative meniscus lens element of each set having its convex surface on the object side, and by using a glass material having a suitably low Abbe number in each of the negative meniscus lenses, it becomes possible to effectively correct the chromatic aberrations, more specifically, the chromatic aberrations on the optical axis, generated by the three concave surfaces of lens elements $L_1$–$L_3$.

The reasons that it is preferred to satisfy each of the conditional expressions (1) through (9) are given hereinafter.

By satisfying conditional expression (1), a sufficient back focus, which is required in order to be able to properly attach the lens to a camera, is obtained. When falling below this minimum value, the back focus is insufficient.

By satisfying conditional expression (2), a prescribed back focus is obtained, making it possible to correct for distortion of the lens. When falling below this minimum value, it becomes difficult to secure the needed back focus; and when exceeding the maximum value, since the generation of distortion increases in the peripheral areas, bending of the image is caused to increase. Thus, a high resolution lens cannot be achieved having a super wide angle of view unless this conditional expression is satisfied.

According to conditional expression (3), the prescribed back focus is secured, making it possible to perform aberration correction. When falling below this minimum value, the back focus becomes difficult to secure; and when exceeding the maximum value it becomes difficult to correct the spherical aberration, since the generation of the distortion aberration is too great, making a high resolution impossible to achieve in the peripheral areas of the image.

Conditional expression (4) is the conditional expression which relates to the refractive index of the glass used in the lens elements $L_1$ and $L_2$, and this expresses the conditions for improving the ease of manufacturing and lowering the cost of these lens elements. When $N_1$ and $N_2$ are not each greater that 1.75, it becomes necessary to reduce the radius of curvature of the concave surface on the image side of both lens element $L_1$ and lens element $L_2$ in order to obtain the necessary negative refractive power, thereby making the shape of the lens element surfaces approach a half sphere, which makes the manufacture of these lens elements more difficult and increases the manufacturing cost.

Conditional expression (5) insures that the chromatic dispersion of lens elements $L_5$ and $L_7$ is sufficient for these lens elements to correct on-axis aberrations that are generated by the three concave surfaces of the lens elements $L_1$–$L_3$.

Conditional expressions (6) and (7) express the conditions relating to the image-side surface of lens element $L_1$ and the image-side surface of lens element $L_2$, respectively. When the radius of curvature falls below this minimum value, the shape of the lens surface approaches a half sphere, which makes the manufacture of these elements more difficult and increases their cost. When exceeding the maximum value, the power of the concave lens surface is reduced and, in that state, since the divergent power of the first lens group $G_1$ is weakened, it becomes impossible to secure the necessary angle of view. Although it is possible to arrange the first lens group $G_1$ farther to the object side in order to achieve the necessary divergent power, this inhibits the compatibility of the super wide angle lens.

Conditional expressions (8) and (9) express conditions relating to the image-side surface of the lens element $L_1$ and the image-side surface of the lens element $L_2$, respectively. The minimum value of the radius of curvature of these surfaces is regulated by the conditional expressions (6) and (7), respectively, for regulating the ease of manufacture and thus the cost of producing these lens elements by grinding of the concave surfaces. However, even if the radius of curvature of the concave lens surface is suitable, if the diameter of the lens increases, then grinding becomes more difficult because the lens shape becomes a deeper concave surface. For this reason, the conditional expressions (8) and (9) become an index between the ratio of the inner diameter of the concave lens surface and the radius of curvature for ease of manufacture and to lower the cost of the lens element. When exceeding the maximum value, the shape of the concave lens surface approaches a half sphere, making the manufacturing process of grinding these lens elements more difficult and expensive.

Two embodiments of the present invention will now be described in detail, with specific data given and with reference to the figures.

Embodiment 1

FIG. 1 shows the components of the super wide angle lens according to the first embodiment of the invention. A diaphragm 1 may be arranged between the lens element $L_4$ and the lens element $L_5$, and light from the exterior that passes through the diaphragm opening is converged by the third lens group $G_3$ so as to form an image on the image plane 3 (at which, for example, may be positioned a fixed imaging terminal such as a CCD array). As illustrated, the super wide angle lens may optionally include a filter component 2 which may be composed of a low pass filter and an infra-red blocking filter arranged at the image side of the third lens group $G_3$.

Table 1 shows the values of the radius of curvature R (in mm) of each lens surface, the on-axis surface spacing D (in mm), as well as the values of the index of refraction $N_d$ and the Abbe number $v_d$ (both for the sodium d-line) of each lens element of embodiment 1. The surface numbers # in the table indicate the surface order from the photographic object side. Moreover, each of the numeric values for R and D are standardized for a case where 1 mm is the focal length for the super wide angle lens.

TABLE 1

| # | R | D | $N_d$ | $v_d$ |
|---|---|---|---|---|
| 1 | 5.273 | 0.593 | 1.77250 | 49.6 |
| 2 | 2.676 | 1.036 | | |
| 3 | 8.135 | 0.663 | 1.77250 | 49.6 |
| 4 | 1.964 | 2.698 | | |
| 5 | −9.704 | 0.628 | 1.80610 | 40.9 |
| 6 | 6.696 | 1.343 | 1.84666 | 23.8 |
| 7 | −5.864 | 0.872 | | |
| 8 | ∞ | 1.374 | | |
| 9 | 10.535 | 0.419 | 1.84666 | 23.8 |
| 10 | 2.619 | 1.867 | 1.54814 | 45.8 |
| 11 | −4.900 | 0.052 | | |
| 12 | 4.449 | 0.419 | 1.84666 | 23.8 |
| 13 | 2.315 | 1.985 | 1.77250 | 49.6 |
| 14 | −7.807 | 1.657 | | |
| 15 | ∞ | 1.744 | 1.51680 | 64.2 |
| 16 | ∞ | | | |

Table 2 indicates the F-number (Fno.), the angle of view (2ω), and the value for each term in the conditional expressions (1)–(9) above of a super wide angle lens according to the first embodiment of the invention.

TABLE 2

| Fno = | 1.24 |
|---|---|
| 2ω = | 121.8° |
| BF/F = | 2.18 |
| $F_{G1}/F$ = | −2.20 |
| $F_{G1,2}/F$ = | −5.04 |
| $N_1$ = | 1.77250 |
| $N_2$ = | 1.77250 |
| $v_{5,7}$ = | 23.8 |
| $R_2/F$ = | 2.68 |
| $R_4/F$ = | 1.96 |
| $P_2/R_2$ = | 1.75 |
| $P_4/R_4$ = | 1.70 |

According to Table 2, embodiment 1 satisfies all of the conditional expressions (1) through (9), and it is apparent that a super wide angle lens is achieved having an F-number of 1.24 and an angle of view of 121.8 degrees.

Figure 3:
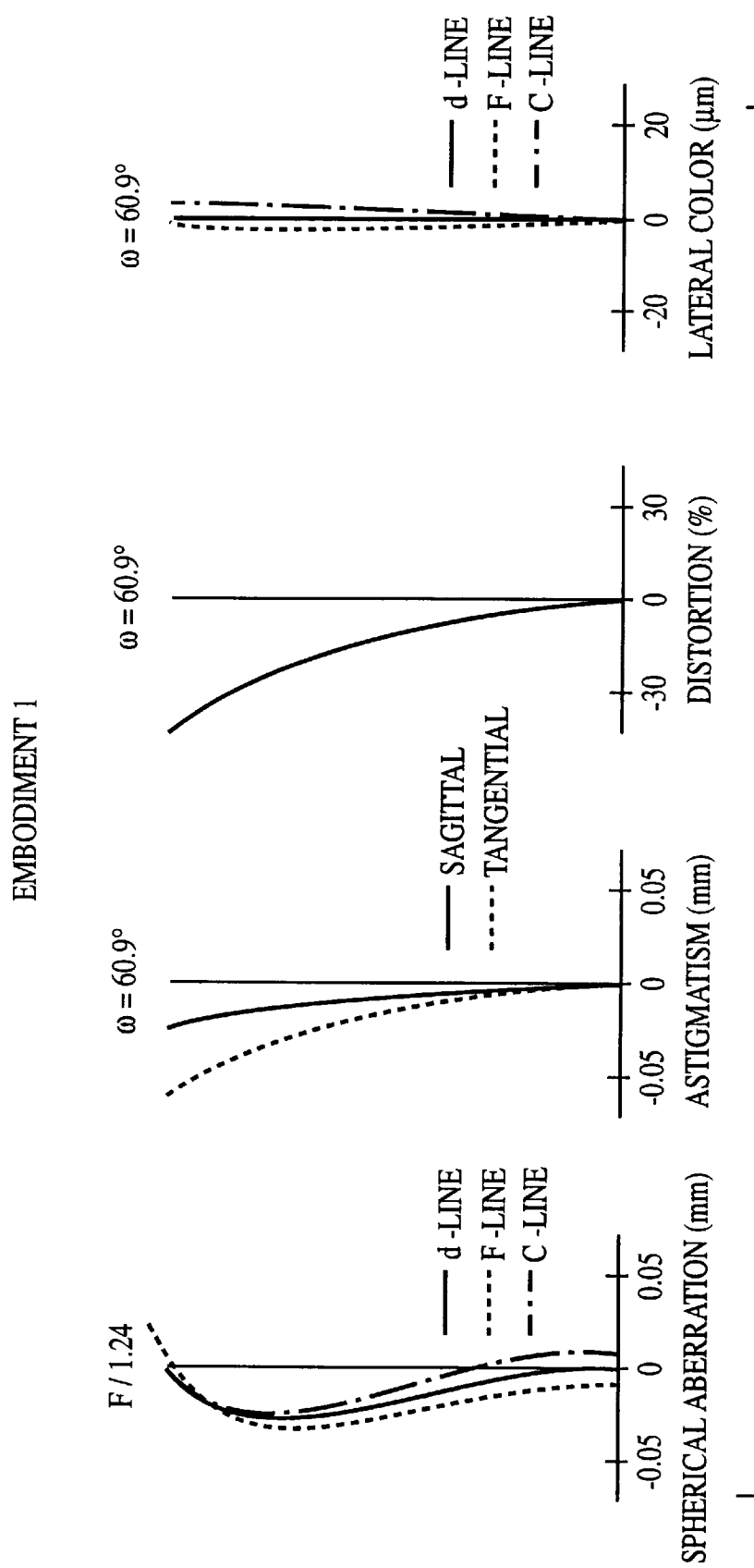
FIG. 3 shows the spherical aberration, astigmatism, distortion, and lateral color of the super wide angle lens according to the first embodiment of the invention.

FIG. 3 shows the spherical aberration, astigmatism, distortion, and lateral color of the super wide angle lens according to the first embodiment of the invention. As is apparent from the figure, according to the present embodiment, it is possible to obtain a super wide angle lens which has favorable imaging performance throughout the peripheral portions of the angle of view.

Embodiment 2

FIG. 2 shows the components of a super wide angle lens according to a second embodiment of the invention, wherein the components are of the same general appearance as those of the first embodiment, shown in FIG. 1, but wherein the construction and performance parameters vary slightly from that of the first embodiment.

Table 3 shows the values of the radius of curvature R (in mm) of each lens surface, the on-axis surface spacing D (in mm), as well as the values of the index of refraction $N_d$ and the Abbe number $v_d$ (both for the sodium d-line) of each lens element of embodiment 2. The surface numbers # in the table indicate the surface order from the photographic object side. Moreover, each of the numeric values for R and D are standardized for a case where 1 mm is the focal length for the super wide angle lens.

TABLE 3

| # | R | D | $N_d$ | $v_d$ |
|---|---|---|---|---|
| 1 | 4.587 | 0.453 | 1.77250 | 49.6 |
| 2 | 2.509 | 1.084 | | |
| 3 | 12.252 | 0.418 | 1.77250 | 49.6 |
| 4 | 1.859 | 2.561 | | |
| 5 | −10.397 | 0.418 | 1.77250 | 49.6 |
| 6 | 11.159 | 1.460 | 1.84666 | 23.8 |
| 7 | −4.770 | 0.767 | | |
| 8 | ∞ | 1.435 | | |
| 9 | 9.783 | 0.348 | 1.84666 | 23.8 |
| 10 | 2.541 | 1.946 | 1.51633 | 64.2 |
| 11 | −4.544 | 0.070 | | |
| 12 | 4.803 | 0.348 | 1.84666 | 23.8 |
| 13 | 2.666 | 1.943 | 1.77250 | 49.6 |
| 14 | −7.399 | 1.633 | | |
| 15 | ∞ | 1.744 | 1.51633 | 64.2 |
| 16 | ∞ | | | |

Table 4 indicates the F-number (Fno.), the angle of view (2ω), and the value for each term in the conditional expressions (1)–(9) above of a super wide angle lens according to the second embodiment of the invention.

TABLE 4

| | |
|---|---|
| Fno | 1.24 |
| 2ω = | 122.8° |
| BF/F = | 2.78 |
| $F_{G1}/F$ = | −1.93 |
| $F_{G1,2}/F$ = | −8.04 |
| $N_1$ = | 1.77250 |
| $N_2$ = | 1.77250 |
| $ν_{5,7}$ = | 23.8 |
| $R_2/F$ = | 2.51 |
| $R_4/F$ = | 1.86 |
| $P_2/R_2$ = | 1.75 |
| $P_4/R_4$ = | 1.69 |

According to Table 4, embodiment 2 satisfies all of the conditional expressions (1) through (9), and it is apparent that a super wide angle lens having an F-number of 1.24 and an angle of view of 122.8 degrees is achieved.

Figure 4:
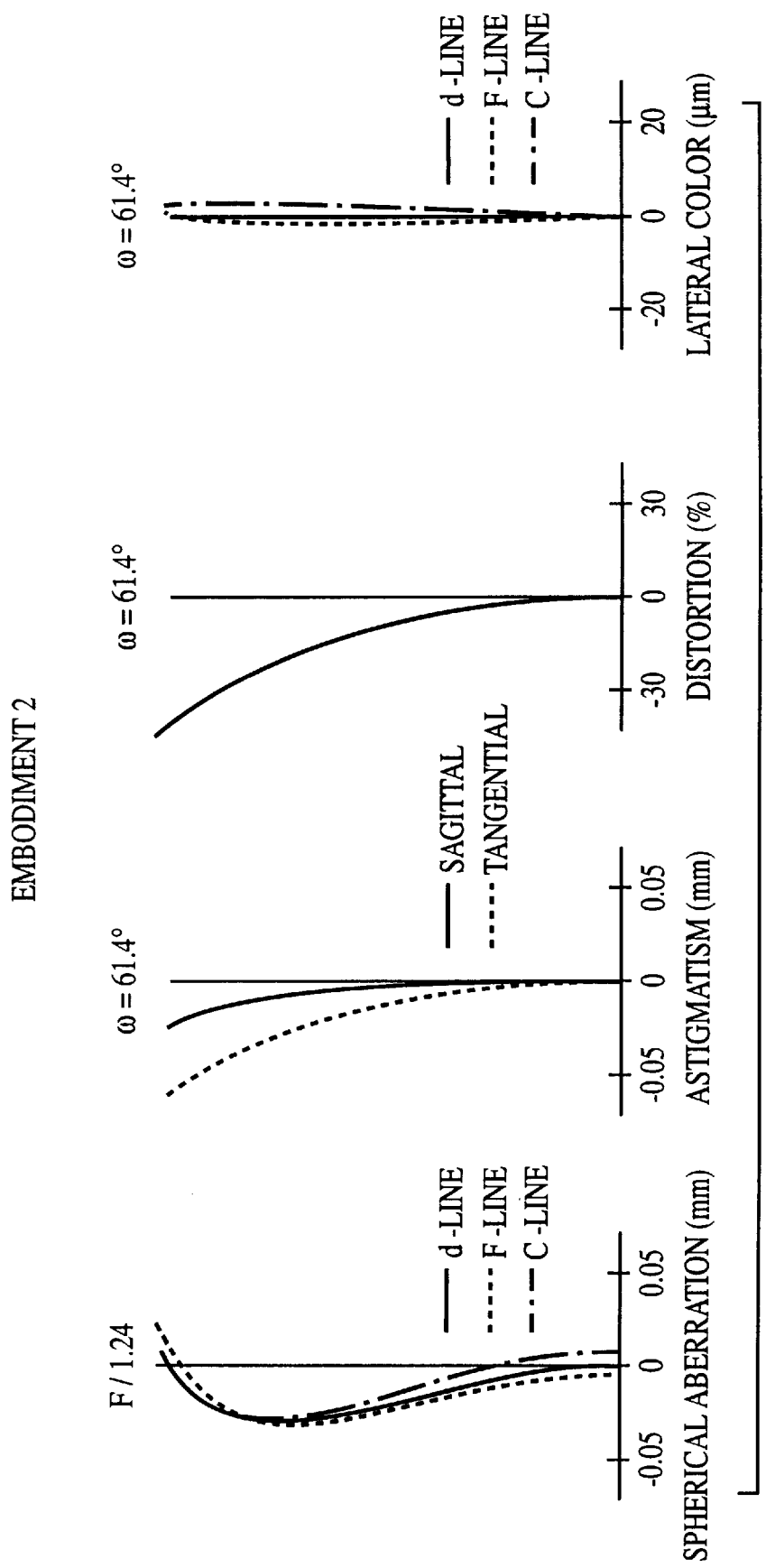
FIG. 4 shows the spherical aberration, astigmatism, distortion, and lateral color of the super wide angle lens according to the second embodiment of the invention.

FIG. 4 shows the spherical aberration, astigmatism, distortion, and lateral color of the super wide angle lens according to the second embodiment of the invention. As is apparent from the figure, according to this embodiment, it is also possible to obtain a super wide angle lens which has favorable imaging performance throughout the peripheral portions of the angle of view.

As described above, according to the invention, it is possible to achieve a super wide angle lens having favorable optical performance and which maintains comparatively small chromatic aberrations and distortion while providing an F-number of about 1.2 with an angle of view greater than 120 degrees. Furthermore, by making the refractive index of the first and second lens elements $L_1$ and $L_2$ equal or exceed 1.75 (conditional expression 1), and by making the Abbe number of the material used for the fifth and seventh lens elements $L_5$ and $L_7$ be less than 30 (conditional expression 5) while satisfying the other conditional expressions (1),(3), (4) and (6)–(9), it is possible to compose a super wide angle lens using lens elements of a shape that may be easily and inexpensively manufactured. The invention being thus described, it will be obvious that the same may be varied in many ways. Such variations are not to be regarded as a departure from the spirit and scope of the invention.

What is claimed is:

1. A wide angle lens comprising, in order from the side of a viewed object:

a first lens group of negative refractive power, said first lens group including, in order from the side of a viewed object, a first lens element composed of a negative meniscus lens with its convex surface on the object side, and a second lens element composed of a negative meniscus lens with its convex surface on the object side;

a second lens group of positive refractive power, said second lens group including, in order from the side of a viewed object, a biconcave, third lens element cemented to a biconvex, fourth lens element; and, a third lens group of positive refractive power, said third lens group including, order from the side of a viewed object, a fifth lens element composed of a negative meniscus lens, with its convex surface on the object side cemented to a sixth lens element composed of a biconvex lens, and a seventh lens element composed of a negative meniscus lens, with its convex surface on the object side cemented to an eighth lens element composed of a biconvex lens;

wherein, said first lens element is the lens element of said wide angle lens that is nearest the object side and there are no intervening lens elements between said first lens element and said eighth lens element.

2. The wide angle lens according to claim 1, said lens further satisfying the following conditional expressions:

BF/F>2.7

$-2.3<F_{G1}/F<-1.8$ $-12.0<F_{G1,2}/F<-4.5$ $N_1=N_2, N_1>1.75, N_2>1.75$ $ν_{5,7}<30$ $2.3<R_2/F<3.0$ $1.6<R_4/F<2.2$ where BF is the back focus of the entire lens, F is the focal distance of the entire lens, $F_{G1}$ is the focal distance of the first lens group, $F_{G1,2}$ is the combined focal distance of the first lens group and the second lens group, $N_1$ is the refractive index for the sodium d-line of the first lens element, $N_2$ is the refractive index for the sodium d-line of the second lens element, $ν_{5,7}$ is the average of the Abbe number for the sodium d-line of the fifth lens element and the seventh lens element, $R_2$ is the radius of curvature of the image-side surface of the first lens element, and $R_4$ is the radius of curvature of the image-side surface of the second lens element.

3. The wide angle lens according to claim 2, said lens further satisfying the following conditional expressions:

$P_2/R_2<1.76$ $P_4/R_4<1.76$ where $P_2$ is the inner diameter of the image-side surface of the first lens element, and $P_4$ is the inner diameter of the image-side surface of the second lens element.

4. The wide angle lens according to claim 1, said lens further satisfying the following construction parameters:

| # | R | D | $N_d$ | $ν_d$ |
|---|---|---|---|---|
| 1 | 5.273 | 0.593 | 1.77250 | 49.6 |
| 2 | 2.676 | 1.036 | | |
| 3 | 8.135 | 0.663 | 1.77250 | 49.6 |
| 4 | 1.964 | 2.698 | | |
| 5 | −9.704 | 0.628 | 1.80610 | 40.9 |
| 6 | 6.696 | 1.343 | 1.84666 | 23.8 |
| 7 | −5.864 | 0.872 | | |
| 8 | ∞ | 1.374 | | |
| 9 | 10.535 | 0.419 | 1.84666 | 23.8 |
| 10 | 2.619 | 1.867 | 1.54814 | 45.8 |
| 11 | −4.900 | 0.052 | | |
| 12 | 4.449 | 0.419 | 1.84666 | 23.8 |
| 13 | 2.315 | 1.985 | 1.77250 | 49.6 |
| 14 | −7.807 | 1.657 | | |
| 15 | ∞ | 1.744 | 1.51680 | 64.2 |
| 16 | ∞ | | | | where # is the surface number, in order from the side of a viewed object,

R is the radius of curvature R in mm of each lens element surface, standardized for a case where the focal length of the super wide angle lens is 1 mm, D is the on-axis surface spacing in mm, standardized for a case where the focal length of the super wide angle lens is 1 mm, $N_d$ is the index of refraction for the sodium d-line of each lens element, and $v_d$ is the Abbe number for the sodium d-line of each lens element.

5. The wide angle lens according to claim 1, said lens further satisfying the following construction parameters:

| # | R | D | $N_d$ | $v_d$ |
|---|---|---|---|---|
| 1 | 4.587 | 0.453 | 1.77250 | 49.6 |
| 2 | 2.509 | 1.084 | | |
| 3 | 12.252 | 0.418 | 1.77250 | 49.6 |
| 4 | 1.859 | 2.561 | | |
| 5 | −10.397 | 0.418 | 1.77250 | 49.6 |
| 6 | 11.159 | 1.460 | 1.84666 | 23.8 |
| 7 | −4.770 | 0.767 | | |
| 8 | ∞ | 1.435 | | |
| 9 | 9.783 | 0.348 | 1.84666 | 23.8 |
| 10 | 2.541 | 1.946 | 1.51633 | 64.2 |
| 11 | −4.544 | 0.070 | | |

-continued

| # | R | D | $N_d$ | $v_d$ |
|---|---|---|---|---|
| 12 | 4.803 | 0.348 | 1.84666 | 23.8 |
| 13 | 2.666 | 1.943 | 1.77250 | 49.6 |
| 14 | −7.399 | 1.633 | | |
| 15 | ∞ | 1.744 | 1.51633 | 64.2 |
| 16 | ∞ | | | | where # is the surface number, in order from the side of a viewed object,

R is the radius of curvature R in mm of each lens element surface, standardized for a case where the focal length of the super wide angle lens is 1 mm, D is the on-axis surface spacing (in mm), standardized for a case where the focal length of the super wide angle lens is 1 mm, $N_d$ is the index of refraction for the sodium d-line of each lens element, and $v_d$ is the Abbe number for the sodium d-line of each lens element.

* * * * *